(12) United States Patent
Touboul

(10) Patent No.: US 7,418,731 B2
(45) Date of Patent: Aug. 26, 2008

(54) METHOD AND SYSTEM FOR CACHING AT SECURE GATEWAYS

(75) Inventor: Shlomo Touboul, Kefar-Haim (IL)

(73) Assignee: Finjan Software, Ltd., Netanya (IL)

( * ) Notice: Subject to any disclaimer, the term of this patent is extended or adjusted under 35 U.S.C. 154(b) by 537 days.

(21) Appl. No.: 10/838,889

(22) Filed: May 3, 2004

(65) Prior Publication Data

US 2005/0005107 A1 Jan. 6, 2005

Related U.S. Application Data

(63) Continuation-in-part of application No. 09/539,667, filed on Mar. 30, 2000, now Pat. No. 6,804,780, which is a continuation of application No. 08/964,388, filed on Nov. 6, 1997, now Pat. No. 6,092,194.

(51) Int. Cl.
 G06F 21/00 (2006.01)
 G06F 15/16 (2006.01)
(52) U.S. Cl. ....................................................... 726/22
(58) Field of Classification Search ........................ None
 See application file for complete search history.

(56) References Cited

U.S. PATENT DOCUMENTS

| | | | |
|---|---|---|---|
| 5,077,677 A | 12/1991 | Murphy et al. | |
| 5,359,659 A | 10/1994 | Rosenthal | |
| 5,361,359 A | 11/1994 | Tajalli et al. | |
| 5,485,409 A | 1/1996 | Gupta et al. | |
| 5,485,575 A | 1/1996 | Chess et al. | |
| 5,572,643 A | 11/1996 | Judson | |
| 5,579,509 A | 11/1996 | Furtney et al. | |
| 5,606,668 A | 2/1997 | Shwed | |
| 5,623,600 A | 4/1997 | Ji et al. | |
| 5,638,446 A | 6/1997 | Rubin | |
| 5,692,047 A | 11/1997 | McManis | |
| 5,692,124 A | 11/1997 | Holden et al. | |
| 5,720,033 A | 2/1998 | Deo | |
| 5,724,425 A | 3/1998 | Chang et al. | |
| 5,740,248 A | 4/1998 | Fieres et al. | |
| 5,761,421 A | 6/1998 | van Hoff et al. | |
| 5,765,205 A | 6/1998 | Breslau et al. | |

(Continued)

FOREIGN PATENT DOCUMENTS

EP 1091276 A1 4/2001

(Continued)

OTHER PUBLICATIONS

U.S. Appl. No. 10/838,889, filed Oct. 26, 1999, Golan , G.

(Continued)

*Primary Examiner*—Christopher A Revak
(74) *Attorney, Agent, or Firm*—Perkins Coie LLP

(57) ABSTRACT

A computer gateway for an intranet of computers, including a scanner for scanning incoming files from the Internet and deriving security profiles therefor, the security profiles being lists of computer commands that the files are programmed to perform, a file cache for storing files, a security profile cache for storing security profiles for files, and a security policy cache for storing security policies for client computers within an intranet, the security policies including a list of restrictions for files that are transmitted to intranet computers. A method and a computer-readable storage medium are also described and claimed.

22 Claims, 3 Drawing Sheets

U.S. PATENT DOCUMENTS

| | | | |
|---|---|---|---|
| 5,784,459 | A | 7/1998 | Devarakonda et al. |
| 5,796,952 | A | 8/1998 | Davis et al. |
| 5,805,829 | A | 9/1998 | Cohen et al. |
| 5,832,208 | A | 11/1998 | Chen et al. |
| 5,832,274 | A | 11/1998 | Cutler et al. |
| 5,850,559 | A | 12/1998 | Angelo et al. |
| 5,859,966 | A | 1/1999 | Hayman et al. |
| 5,864,683 | A | 1/1999 | Boebert et al. |
| 5,892,904 | A | 4/1999 | Atkinson et al. |
| 5,951,698 | A | 9/1999 | Chen et al. |
| 5,956,481 | A | 9/1999 | Walsh et al. |
| 5,974,549 | A | 10/1999 | Golan |
| 5,978,484 | A | 11/1999 | Apperson et al. |
| 5,983,348 | A | 11/1999 | Ji |
| 6,092,194 | A | 7/2000 | Touboul |
| 6,154,844 | A | 11/2000 | Touboul |
| 6,167,520 | A | 12/2000 | Touboul |
| 6,339,829 | B1 | 1/2002 | Beadle et al. |
| 6,480,962 | B1 | 11/2002 | Touboul |
| 6,804,780 | B1 | 10/2004 | Touboul |
| 6,917,953 | B2 * | 7/2005 | Simon et al. ............... 707/204 |

FOREIGN PATENT DOCUMENTS

| | | |
|---|---|---|
| EP | 1132796 A1 | 9/2001 |

OTHER PUBLICATIONS http://www.codeguru.com/Cpp/Cpp/cpp_mfc/parsing/article.php/c4093/.

http://www.cs.may.ie/~jpower/Courses/compilers/notes/lexical.pdf.

http://www.mail-archive.com/kragen-tol@canonical.org/msg00097.html.

http://www.owlnet.rice.edu/~comp412/Lectures/L06LexWrapup4.pdf.

http://www.cs.odu.edu/~toida/nerzic/390teched/regular/fa/min-fa.html.

http://rw4.cs.uni-sb.de/~ganimal/GANIFA/page16_e.htm.

http://www.cs.msstate.edu/~hansen/classes/3813fall01/slides/06Minimize.pdf.

http://www.win.tue.nl/~watson/2R870/downloads/madfa_algs.pdf.

http://www.cs.nyu.edu/web/Research/Theses/chang_chia-hsiang.pdf.

"Products" Article published on the Internet, "Revolutionary Security for A New Computing Paradigm" regarding SurfinGate™ 7 pages.

"Release Notes for the Microsoft ActiveX Development Kit", Aug. 13, 1996, activex.adsp.or.jp/inetsdk/readme.txt, pp. 1-10.

Doyle et al., "Microsoft Press Computer Dictionary" 1993, Microsoft Press, 2nd Edition, pp. 137-138.

Finjan Software Ltd., "Powerful PC Security for the New World of Java™ and Downloadables, Surfin Shield™" Article published on the Internet by Finjan Software Ltd., 1996, 2 pages.

Finjan Software Ltd., "Finjan Announces a Personal Java™ Firewall For Web Browsers—the SurfinShield™ 1.6 (formerly known as SurfinBoard)", Press Release of Finjan Releases SurfinShield 1.6, Oct. 21, 1996, 2 pages.

Finjan Software Ltd., "Finjan Announces Major Power Boost and New Features for SurfinShield™ 2.0" Las Vegas Convention Center/Pavilion 5 P5551, Nov. 18, 1996, 3 pages.

Finjan Software Ltd., "Finjan Software Releases SurfinBoard, Industry's First Java Security Product For the World Wide Web", Article published on the Internet by Finjan Software Ltd., Jul. 29, 1996, 1 page.

Finjan Software Ltd., "Java Security: Issues & Solutions" Article published on the Internet by Finjan Software Ltd., 1996, 8 pages.

Finjan Software Ltd., Company Profile "Finjan—Safe Surfing, The Java Security Solutions Provider" Article published on the Internet by Oct. 31, 1996, 3 pages.

IBM AntiVirus User's Guide Version 2.4, International Business Machines Corporation, Nov. 15, 1995, p. 6-7.

Khare, R. "Microsoft Authenticod Analyzed" Jul. 22, 1996, xent.com/FoRK-archive/smmer96/0338.html, p. 1-2.

LaDue, M., "Online Business Consultant: Java Security: Whose Business Is It?" Article published on the Internet, Home Page Press, Inc. 1996, 4 pages.

Leach, Norvin et al., "IE 3.0 Applets Will Earn Certification", PC Week, vol. 13, No. 29, Jul. 22, 1996, 2 pages.

Moritz, R., "Why We Shouldn't Fear Java" Java Report, Feb. 1997, pp. 51-56.

Microsoft—"Microsoft ActiveX Software Development Kit" Aug. 12, 1996, activex.adsp.or.jp/inetsdk/help/overview.htm, pp. 1-6.

Microsoft Corporation, Web Page Article "Frequently Asked Questions About Authenticode", last updated Feb. 17, 1997, Printed Dec. 23, 1998. URL: http://www.microsoft.com/workshop/security/authcode/signfaq.asp#9, pp. 1-13.

Microsoft® Authenticode Technology, "Ensuring Accountability and Authenticity for Software Components on the Internet", Microsoft Corporation, Oct. 1996, including Abstract, Contents, Introduction and pp. 1-10.

Okamoto, E. et al., "ID-Based Authentication System For Computer Virus Detection", IEEE/IEE Electronic Library online, Electronics Letters, vol. 26, Issue 15, ISSN 0013-5194, Jul. 19, 1990, Abstract and pp. 1169-1170. URL: http://iel.ihs.com:80/cgi-bin/iel_cgi?se...2ehts%26ViewTemplate%3ddocview%5fb%2ehts.

Omura, J. K., "Novel Applications of Cryptography in Digital Communications", IEEE Communications Magazine, May 1990; pp. 21-29.

Schmitt, D.A., ".EXE files, OS-2 style" PC Tech Journal, v6, n11, p. 76 (13).

Zhang, X.N., "Secure Code Distribution", IEEE/IEE Electronic Library online, Computer, vol. 30, Issue 6, Jun. 1997, pp. 76-79.

* cited by examiner

US 7,418,731 B2

METHOD AND SYSTEM FOR CACHING AT SECURE GATEWAYS

CROSS REFERENCES TO RELATED APPLICATIONS

This application is a continuation-in-part of assignee's application U.S. Ser. No. 09/539,667 (now U.S. Pat. No. 6,804,780), filed on Mar. 30, 2000, and entitled SYSTEM AND METHOD FOR PROTECTING A COMPUTER AND A NETWORK FROM HOSTILE DOWNLOADABLES, which is a continuation of U.S. Ser. No. 08/964,388 (now U.S. Pat. No. 6,092,194), filed on Nov. 6, 1997 and entitled SYSTEM AND METHOD FOR PROTECTING A COMPUTER AND A NETWORK FROM HOSTILE DOWNLOADABLES.

FIELD OF THE INVENTION

The present invention relates to computer security and network gateways.

BACKGROUND OF THE INVENTION

A network gateway computer conventionally serves as a proxy between a group of inter-connected computers, referred to as an intranet, such as a corporate intranet or customers of an Internet service provider, and the myriads of server computers on the Internet. The gateway computer is networked with the intranet computers in such a way that outgoing requests and responses from the intranet computers to the Internet, and incoming requests and responses from the Internet to the intranet computers are routed through the gateway computer.

Typically, a request is issued as an HTTP protocol request that includes a URI for a file, such as an HTML page, a JPEG image or a PDF document, residing on one or more server computers on the Internet. Similarly, a response is typically an HTTP response including a requested file, sent back to a client in response to a request.

Network gateways are generally connected to an intranet with high-speed lines, so that the bandwidth between the intranet computers and the gateway computer is much higher than the bandwidth between the gateway computer and rest of the Internet.

Two important functions of computer gateways are (i) to restrict outsiders from unauthorized access to a computer intranet, and (ii) to protect the intranet computers from software containing computer viruses and from spam. Computer gateways may contain conventional firewall software that restricts outside communication with the intranet, anti-virus software that identifies computer viruses residing within files retrieved from the Internet, and anti-spam software that filters out unwanted content.

Current gateway systems cause latency because clients do not access websites directly, and because current gateway systems apply security protocols to protect intranet members. Accordingly, systems and methods for reducing network access latency without compromising network safety are needed.

SUMMARY OF THE INVENTION

The present invention provides a method and system for improving performance of gateway computers. Specifically, the present invention mitigates network latency caused by processing time at a gateway computer.

There is thus provided in accordance with a preferred embodiment of the present invention a computer gateway for an intranet of computers, including a scanner for scanning incoming files from the Internet and deriving security profiles therefor, the security profiles being lists of computer commands that the files are programmed to perform, a file cache for storing files, a security profile cache for storing security profiles for files, and a security policy cache for storing security policies for intranet computers within an intranet, the security policies including a list of restrictions for files that are transmitted to intranet computers.

There is further provided in accordance with a preferred embodiment of the present invention a method for operation of a network gateway for an intranet of computers, including receiving a request from an intranet computer for a file on the Internet, determining whether the requested file resides within a file cache at the network gateway, if the determining is affirmative then retrieving a security profile for the requested file from a security profile cache at the network gateway, the security profile including a list of at least one computer command that the file is programmed to perform, and if the determining is not affirmative then retrieving the requested file from the Internet, scanning the retrieved file to determine computer commands that the file is programmed to perform, deriving a security profile for the retrieved file, storing the retrieved file within the file cache, and storing the security profile for the retrieved file within a security profile cache, retrieving a security policy for the intranet computer from a security policy cache at the network gateway, the security policy defining restrictions for transmitting files to the intranet computer, and comparing the security profile for the requested file vis a vis the security policy for the intranet computer, to determine whether transmission of the requested file to the intranet computer is to be restricted.

There is yet further provided in accordance with a preferred embodiment of the present invention a computer-readable storage medium storing program code for causing a computer to perform the steps of receiving a request from an intranet computer for a file on the Internet, determining whether the requested file resides within a file cache at the network gateway, if the determining is affirmative then retrieving a security profile for the requested file from a security profile cache at the network gateway, the security profile including a list of at least one computer command that the file is programmed to perform, and if the determining is not affirmative then retrieving the requested file from the Internet, scanning the retrieved file to determine computer commands that the file is programmed to perform, deriving a security profile for the retrieved file, storing the retrieved file within the file cache, and storing the security profile for the retrieved file within a security profile cache, retrieving a security policy for the intranet computer from a security policy cache at the network gateway, the security policy defining restrictions for transmitting files to the intranet computer, and comparing the security profile for the requested file vis a vis the security policy for the intranet computer, to determine whether transmission of the requested file to the intranet computer is to be restricted.

There is moreover provided in accordance with a preferred embodiment of the present invention a method for operation of a network gateway for an intranet of computers, including receiving a request from an intranet computer for a file on the Internet, retrieving a security profile for the requested file from a security profile cache at the network gateway, the security profile including a list of at least one computer command that the file is programmed to perform, retrieving a security policy for the intranet computer from a security policy cache at the network gateway, the security policy defining restrictions on files that can be transmitted to the intranet computer, and comparing the security profile for the requested file vis a vis the security policy for the intranet computer, to determine whether transmission of the requested file to the intranet computer is to be restricted.

There is additionally provided in accordance with a preferred embodiment of the present invention a computer-readable storage medium storing program code for causing a computer to perform the steps of receiving a request from an intranet computer for a file on the Internet, retrieving a security profile for the requested file from a security profile cache at the network gateway, the security profile including a list of at least one computer command that the file is programmed to perform, retrieving a security policy for the intranet computer from a security policy cache at the network gateway, the security policy defining restrictions on files that can be transmitted to the intranet computer, and comparing the security profile for the requested file vis a vis the security policy for the intranet computer, to determine whether transmission of the requested file to the intranet computer is to be restricted.

There is further provided in accordance with a preferred embodiment of the present invention a method for operation of a network gateway for an intranet of computers, including retrieving a requested file from the Internet, scanning the retrieved file to determine computer commands that the file is programmed to perform, deriving a security profile for the retrieved file, the security profile including a list of at least one computer command that the retrieved file is programmed to perform, storing the retrieved file within a file cache, and storing the security profile for the retrieved file within a security profile cache.

There is yet further provided in accordance with a preferred embodiment of the present invention a computer-readable storage medium storing program code for causing a computer to perform the steps of retrieving a requested file from the Internet, scanning the retrieved file to determine computer commands that the file is programmed to perform, deriving a security profile for the retrieved file, the security profile including a list of at least one computer command that the retrieved file is programmed to perform, storing the retrieved file within a file cache, and storing the security profile for the retrieved file within a security profile cache.

There is moreover provided in accordance with a preferred embodiment of the present invention a computer gateway for an intranet of computers, including a file cache for storing files, a security profile cache for storing security profiles for files, the security profiles being lists of computer commands that the files are programmed to perform, and a security policy cache for storing security policies for intranet computers within an intranet, the security policies including a list of restrictions for files that are transmitted to intranet computers.

There is additionally provided in accordance with a preferred embodiment of the present invention a method for operation of a network gateway for an intranet of computers, including receiving a request from an intranet computer for a file on the Internet, determining whether the requested file resides within a file cache at the network gateway, if the determining is affirmative retrieving a security profile for the requested file from a security profile cache at the network gateway, the security profile including a list of at least one computer command that the file is programmed to perform, and if the determining is not affirmative retrieving the requested file from the Internet, storing the retrieved file within the file cache, and storing a security profile for the retrieved file within a security profile cache, retrieving a security policy for the intranet computer from a security policy cache at the network gateway, the security policy defining restrictions for transmitting files to the intranet computer, and comparing the security profile for the requested file vis a vis the security policy for the intranet computer, to determine whether transmission of the requested file to the intranet computer is to be restricted.

There is further provided in accordance with a preferred embodiment of the present invention a computer-readable storage medium storing program code for causing a computer to perform the steps of receiving a request from an intranet computer for a file on the Internet, determining whether the requested file resides within a file cache at the network gateway, if the determining is affirmative retrieving a security profile for the requested file from a security profile cache at the network gateway, the security profile including a list of at least one computer command that the file is programmed to perform, and if the determining is not affirmative retrieving the requested file from the Internet, storing the retrieved file within the file cache, and storing a security profile for the retrieved file within a security profile cache, retrieving a security policy for the intranet computer from a security policy cache at the network gateway, the security policy defining restrictions for transmitting files to the intranet computer, and comparing the security profile for the requested file vis a vis the security policy for the intranet computer, to determine whether transmission of the requested file to the intranet computer is to be restricted.

There is moreover provided in accordance with a preferred embodiment of the present invention a computer gateway for an intranet of computers, including a scanner for scanning outgoing files from an intranet to the Internet and deriving security profiles therefor, the security profiles being lists of computer commands that the files are programmed to perform, a security policy cache for storing security policies for recipient computers within the Internet, the security policies including a list of restrictions for files that are transmitted to recipient computers.

There is additionally provided in accordance with a preferred embodiment of the present invention a method for operation of a network gateway for an intranet of computers, including receiving a file from an intranet computer for transmission to a recipient computer on the Internet, scanning the received file to derive a security profile for the received file, the security profile including a list of at least one computer command that the file is programmed to perform, retrieving a security policy from a security policy cache at the network gateway, the security policy defining restrictions for transmitting files to recipient computers, and comparing the security profile for the received file vis a vis the security policy, to determine whether transmission of the requested file to the recipient computer is to be restricted.

There is further provided in accordance with a preferred embodiment of the present invention a computer-readable storage medium storing program code for causing a computer to perform the steps of receiving a file from an intranet computer for transmission to a recipient computer on the Internet, scanning the received file to derive a security profile for the received file, the security profile including a list of at least one computer command that the file is programmed to perform, retrieving a security policy from a security policy cache at the network gateway, the security policy defining restrictions for transmitting files to recipient computers, and comparing the security profile for the received file vis a vis the security policy, to determine whether transmission of the requested file to the recipient computer is to be restricted.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention provides a system and method for optimizing performance of network gateways that perform security-based functions.

Figure 1:
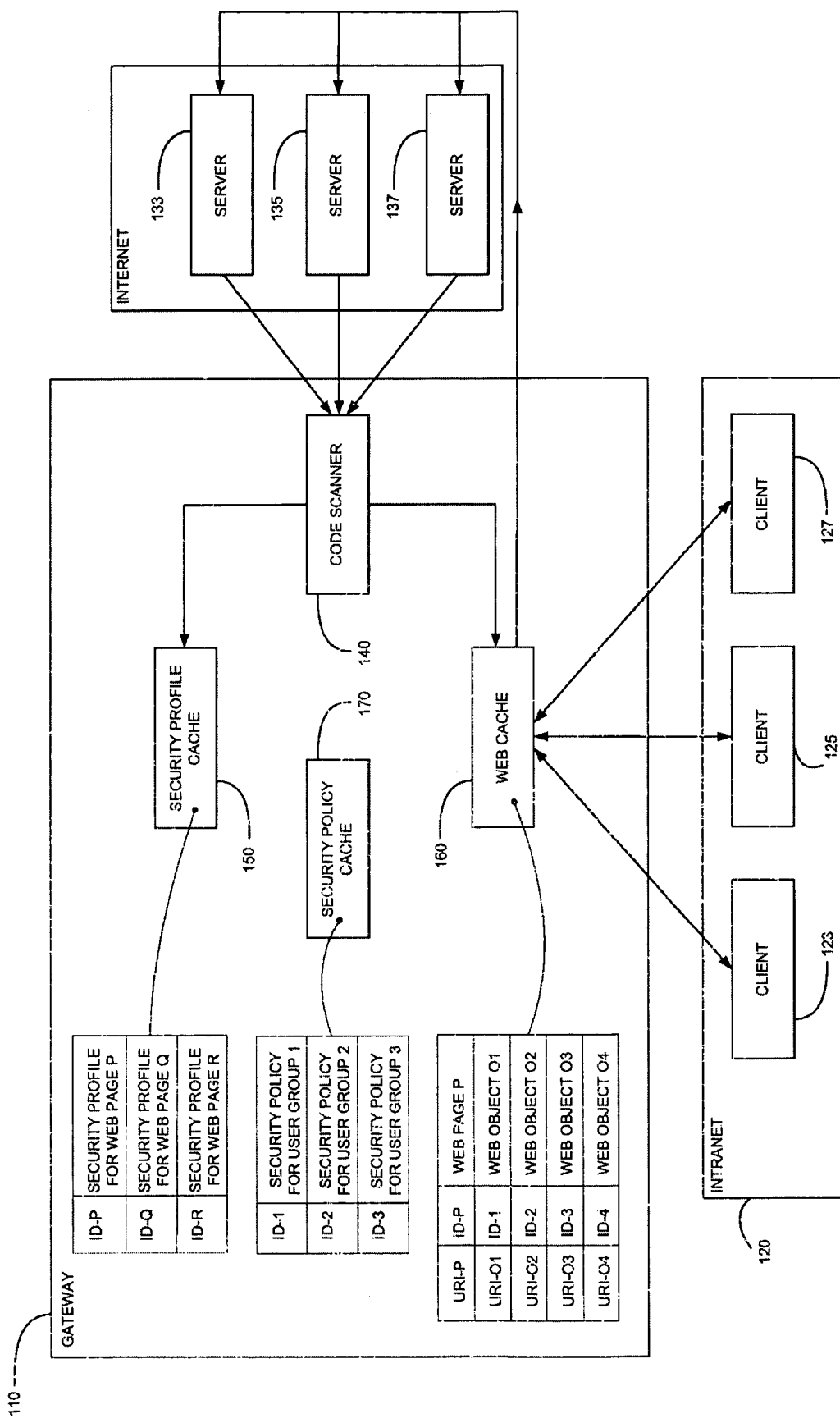
FIG. 1 is a simplified block diagram for a network gateway, in accordance with a preferred embodiment of the present invention.

Reference is now made to FIG. 1, which is a simplified block diagram for a network gateway, in accordance with a preferred embodiment of the present invention. Shown in FIG. 1 is a network gateway computer 110, which serves as a proxy between an intranet of clients and servers, and the Internet. Specifically in FIG. 1, gateway computer 110 intervenes between requests for web pages originating from an intranet 120 of clients 123, 125 and 127, and responses originating from Internet servers 133, 135 and 137.

Typically, web pages include text, executable scripts and one or more links to web objects that must be retrieved in order to completely render the web page. Such web objects include inter alia images, sounds, multimedia presentations, video clips and also active code that runs on the client computer. Executable scripts and active code components are a security concern, since they may contain computer viruses that maliciously harm client computers. In fact, most viruses today are transmitted as active web objects or as e-mail attachments.

Preferably, gateway computer 110 includes a code scanner 140, for scanning incoming web pages and web objects in order to detect the presence of malicious executable scripts or active code. Preferably when gateway 110 receives a web page, it also retrieves the web objects referenced by the web page, and scanner 140 scans the web page and the web objects that may be malicious. For example, a web page, P, requested by a client computer, may contain references to web objects O1, O2, O3 and O4. Generally, the web page, P, and the web objects it references, O1, O2, O3 and O4 are stored as files within the Internet.

When the web page, P, first arrives at gateway computer 110, gateway computer 110 preferably retrieves objects O1, O2, O3 and O4. Gateway computer 110 then decides which of web page P and objects O1, O2, O3 and O4 may potentially be malicious, and scanner 140 scans each of the potentially malicious files. Determination of which files may be potentially malicious may be based on numerous criteria—for example, multimedia objects such as images and video clips may be deemed safe, whereas Visual Basic scripts and Java applets may be deemed potentially malicious.

In accordance with a preferred embodiment of the present invention, scanner 140 analyzes each file it scans to determine the nature of computer operations that the file is programmed to perform, and derives a security profile therefor, summarizing potentially malicious computer operations. Thus scanner 140 may determine inter alia that a file is programmed to access a computer file system, or a computer operating system, or open a network socket.

Table I below indicates a typical scan analysis, in accordance with a preferred embodiment of the present invention. As can be seen from Table I, web page P and web objects O1 and O4 are deemed potentially malicious. Web objects O2 and O3 are deemed safe. The security profile for web page P includes security profiles for JavaScript within page P, and for web objects O1 and O4 referenced by page P. Web objects O2 and O3 are not scanned, since they are deemed to be safe.

TABLE I

Security Profile for Web Page P

| | Potentially Malicious? | File System Commands | Operating System Commands | Network Commands |
|---|---|---|---|---|
| | | | Security Profile | |
| Web Page P References objects O1, O2, O3 and O4 Includes JavaScript | Yes | None | None | Issue HTTP request; |
| Web Object O1 Java applet | Yes | Open file F1; Write file F2; Delete file F1 | Open registry; Edit registry | None |
| Web Object O2 Still image | No | | | |
| Web Object O3 Audio clip | No | | | |
| Web Object O4 ActiveX Control | Yes | Open file F1; Copy file F1 | None | Open socket; FTP send |

In accordance with a preferred embodiment of the present invention, web page security profiles are stored in a security profile cache 150, and the web page and the web objects that the page references are stored in a web cache 160. Security profile cache 150 preferably includes a table as indicated in Table II.

TABLE II

Structure of Security Profile Cache 150

| Web Content ID | Web Content Security Profile |
|---|---|

Web content ID is preferably a has ID that serves as a key for Table II. Similarly, web content cache 160 preferably includes a table as indicated in Table III.

TABLE III

Structure of Web Content Cache 160

| Web Content URI | Web Content ID | Web Content |
| --- | --- | --- |

Web content URI serves as a key for Table III, and Web Content ID is a foreign key that can be used to join Table II with Table III.

It may be appreciated that the same web page or web object may be stored at multiple locations and, as such, multiple URIs may correspond to the same web content. In a preferred embodiment of the present invention, web cache 160 is managed so as to avoid caching duplicate web content. Use of a hash ID for web pages and web objects serves to identify web content duplicates, and to determine if web content on the Internet has changed since it was earlier cached within web content cache 160. In case web content has changed, then preferably the more recent web content is cached instead of the older web content, and the newer web content is scanned by code scanner 140, in order to update its security profile within security profile cache 150.

Preferably, when a client computer requests a web page, P, from a server computer, the request is first transmitted to gateway computer 110, which checks whether or not the web page is already resident within web cache 160. If not, then computer gateway forwards the request to the server computer, which in turn sends the requested web page, P, to gateway computer 110 within a response. Requests and responses are typically formatted according to the HTTP protocol. Upon receipt of the requested web page, gateway computer 110 (i) fetches the web objects referenced by page P, such as web objects O1, O2, O3 and O4 hereinabove; (ii) determines which files to scan; (iii) determines security profiles for the scanned files; (iv) caches the security profiles for web page P in security profile cache 150; and (v) caches web page P and web objects O1, O2, O3 and O4 in web cache 160.

After gateway computer 110 has stored web page P in web cache 160, and has stored its corresponding security profile in security profile cache 150, it determines whether or not to send web page P to the client computer that requested it. If web page P may perform malicious operations to the client computer, then gateway computer 110 may not transmit web page P.

The decision whether or not to transmit web page P to the requesting client computer is preferably based on a security policy for the client computer. A security policy indicates suspicious operations that are to be blocked from a client computer. Thus by comparing the operations within a security profile for a web page, P, vis a vis the operations listed within a security policy that are to be blocked, a determination can be made whether or not to transmit web page P to a client computer. Preferably, security policies are stored within a security policy cache 170 on gateway computer 110.

Use of security profiles and security policies are described in Applicant's U.S. Pat. No. 6,092,494 entitled SYSTEM AND METHOD FOR PROTECTING A COMPUTER AND A NETWORK FROM HOSTILE DOWNLOADABLES, U.S. Pat. No. 6,154,844 entitled SYSTEM AND METHOD FOR ATTACHING A DOWNLOADABLE SECURITY PROFILE TO A DOWNLOADABLE, U.S. Pat. No. 6,167, 520 entitled SYSTEM AND METHOD FOR PROTECTING A CLIENT DURING RUNTIME FROM HOSTILE DOWNLOADABLES, U.S. Pat. No. 6,480,962 entitled SYSTEM AND METHOD FOR PROTECTING A CLIENT DURING RUNTIME FROM HOSTILE DOWNLOADABLES. U.S. Pat. No. 6,804,780 entitled SYSTEM AND METHOD FOR PROTECTING A COMPUTER AND A NETWORK FROM HOSTILE DOWNLOADABLES, U.S. Pat. No. 6,965,968 entitled POLICY-BASED CACHING, and U.S. Pat. No. 7,058,822 entitled MALICIOUS MOBILE CODE RUNTIME MONITORING SYSTEM AND METHODS.

It may be appreciated that the various caches within gateway computer 110 security profile cache 150, web cache 160 and security policy cache 170, must be managed in order to be kept current as files on the Internet are replaced with newer versions, and in order to appropriately purge items from cache when cache memory is full and new items arrive for storage. Typically, web cache 160 is the cache that fills up, since web objects such as applets and multimedia files tend to be very large. In accordance with a preferred embodiment of the present invention, caches 150 and 160 are synchronized, so that when a file is purged from web cache 160, its corresponding security profile is purged from cache 150.

Methodologies for keeping caches 150 and 160 current include inter alia:
 replacing cached files regularly on a periodic basis, such as every 24 hours, and re-scanning them to derive updated security profiles;
 replacing files based on expiration dates and times included within the file headers, and re-scanning them to derive updated security profiles; and
 checking the Internet to determine whether cached files are current whenever they are requested by an intranet computer.

Methodologies for purging files when cache 160 is full include inter alia:
 purging the oldest files;
 purging the least accessed files; and
 purging the files that have not been accessed for the longest time; i.e., last recently used (LRU).

It may be appreciated that although web content is purged from cache 160 in order to free up memory, the security profile of the purged content need not be purged from security profile cache 150. In such a case, if the purged web content is subsequently re-cached and has not changed, then code scanner 140 need not re-scan the content. Preferably, the web content ID is used to determine if web content re-entering the cache is identical to previously cached web content.

Security policies are typically specified by a system administrator and, as such, security policy cache 170 is controlled by the system administrator.

It may be appreciated by those skilled in the art that code scanner 140 may be updated from time to time. In accordance with a preferred embodiment of the present invention, when code scanner 140 is updated, cached web content is re-scanned to update the corresponding security profiles, in order to maintain synchronization between security profile cache 150 and web content cache 160.

Figure 2:
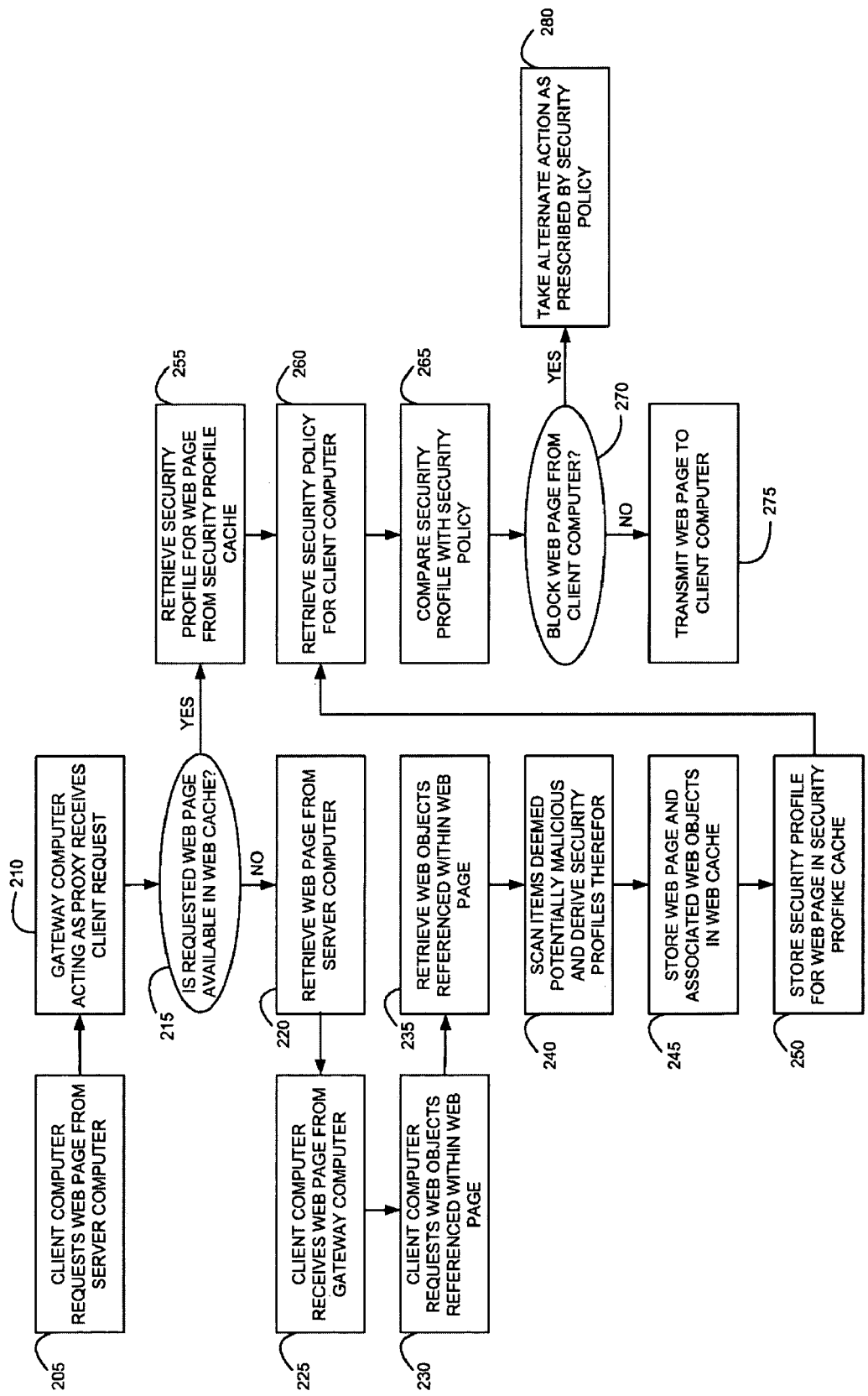
FIG. 2 is a simplified flowchart for operation of a network gateway, in accordance with a preferred embodiment of the present invention.

Reference is now made to FIG. 2, which is a simplified flowchart for operation of a network gateway, in accordance with a preferred embodiment of the present invention. All of the steps shown in FIG. 2 are performed by a network gateway computer, except for steps 205, 225 and 230, which are performed by an intranet client computer. As shown in FIG. 2, at step 205 an intranet client computer requests an Internet web page. Typically, the web page is designated by a Universal Resource Identifier (URI), which is a conventional identifier including both an IP address for an Internet server computer and a file location within the server computer's file system. The client request is routed through a network gateway, which acts as a proxy between a group of client computers and the Internet. Thus at step 210 a network gateway computer receives the client request.

At step 215 the gateway computer determines whether or not the requested web page is already resident within its web cache. Preferably, the web cache is indexed by URI, so that the gateway computer can readily determine whether or not the requested web page is available. If the requested web page is already available in the web cache, processing continues at step 255. Otherwise, at step 220 the gateway computer retrieves the requested web page from the Internet, using the web page's URI to determine its location. At step 225 the client computer receives the requested web page from the gateway computer, and at step 230 the client computer identifies the web objects referenced within the web page it receives and requests them from the gateway computer.

Typically, web objects are referenced by individual URIs. Thus web objects O1, O2, O3 and O4 above typically each have their own URIs, say, URI1, URI2, URI3 and URI4. At step 235 the gateway computer retrieves the referenced web objects from the Internet, using their individual URIs to determine their locations. It may be appreciated that although the requested web page is not available in the web cache at step 215, it is possible that one or more of the web objects it references are nevertheless available in cache. As such, the gateway computer may not be required to retrieve all of the referenced web objects at step 235.

At step 240 the gateway computer determines which of the web page and its referenced web objects are deemed potentially malicious, and scans those files that are so deemed. In accordance with a preferred embodiment of the present invention, the scans operate to identify computer commands that a file is programmed to carry out, and record potentially malicious commands in a list that serves as a security profile. Typically, the list includes commands that operate on a computer file system or operating system, and commands that perform network operations such as opening of a network socket or transmission of data.

At step 245 the gateway computer stores the retrieved web page and the retrieved web objects within its web cache, and at step 250 the gateway computer stores the corresponding security profiles that it derived within its security profile cache. Preferably, security profiles within the security profile cache are indexed by URIs, similar to the way web pages and web objects are indexed within the web cache.

If the requested web page is determined to be resident within the gateway computer's web cache at step 215, then gateway computer simply retrieves a security profile for the requested web page from its security profile cache at step 255. In this case, it is not necessary to retrieve the web page and its web objects from the Internet and derive their security profiles, as was done in steps 220-250.

At step 260 the gateway computer retrieves a security policy for the intranet client computer that requested the web page at step 205. Preferably, security profiles are indexed by user groups; i.e., a security profile for an intranet computer depends on which group of users the user of the computer belongs to.

At step 265 the gateway computer analyzes the web page security profile vis a vis the client computer security policy. At step 270 the gateway computer determines, based on the results of the analysis at step 265, whether or not to block the web page from being transmitted to the requesting intranet computer, in order to protect the intranet computer from potentially malicious software. If the gateway computer determines that the web page is permitted, then at step 275 the gateway computer transmits the web page to the requesting intranet computer, closing the request-response cycle that began at step 205.

It may be appreciated that when client computer receives the requested web page and renders it, it subsequently requests the web objects referenced within the web page, and the request is handled by the gateway computer, which has the web objects within its web cache. Typically, web objects can be large files, so the caching of web objects within the gateway computer's web cache eliminates significant network latency for client computers.

Otherwise, if the gateway computer determines at step 270 that the web page is to be blocked, then at step 280 the gateway computer takes an alternate action. Preferably, the alternate action is defined within the client computer's security policy, and includes alternatives such as sending a notification to the client computer, sending a notification to a system administrator, sending only a portion of the requested web page, or allowing the intranet computer to decide whether or not to trust the suspicious web page.

In the embodiment of the present invention described with reference to FIGS. 1 and 2, the system and method are used to control incoming traffic from outside of an enterprise intranet to within the intranet. In an alternative embodiment the present invention can be used to control outgoing traffic; i.e., for scanning outgoing web pages and web objects to control content that is sent from within an enterprise intranet to computers outside of the intranet.

Figure 3:
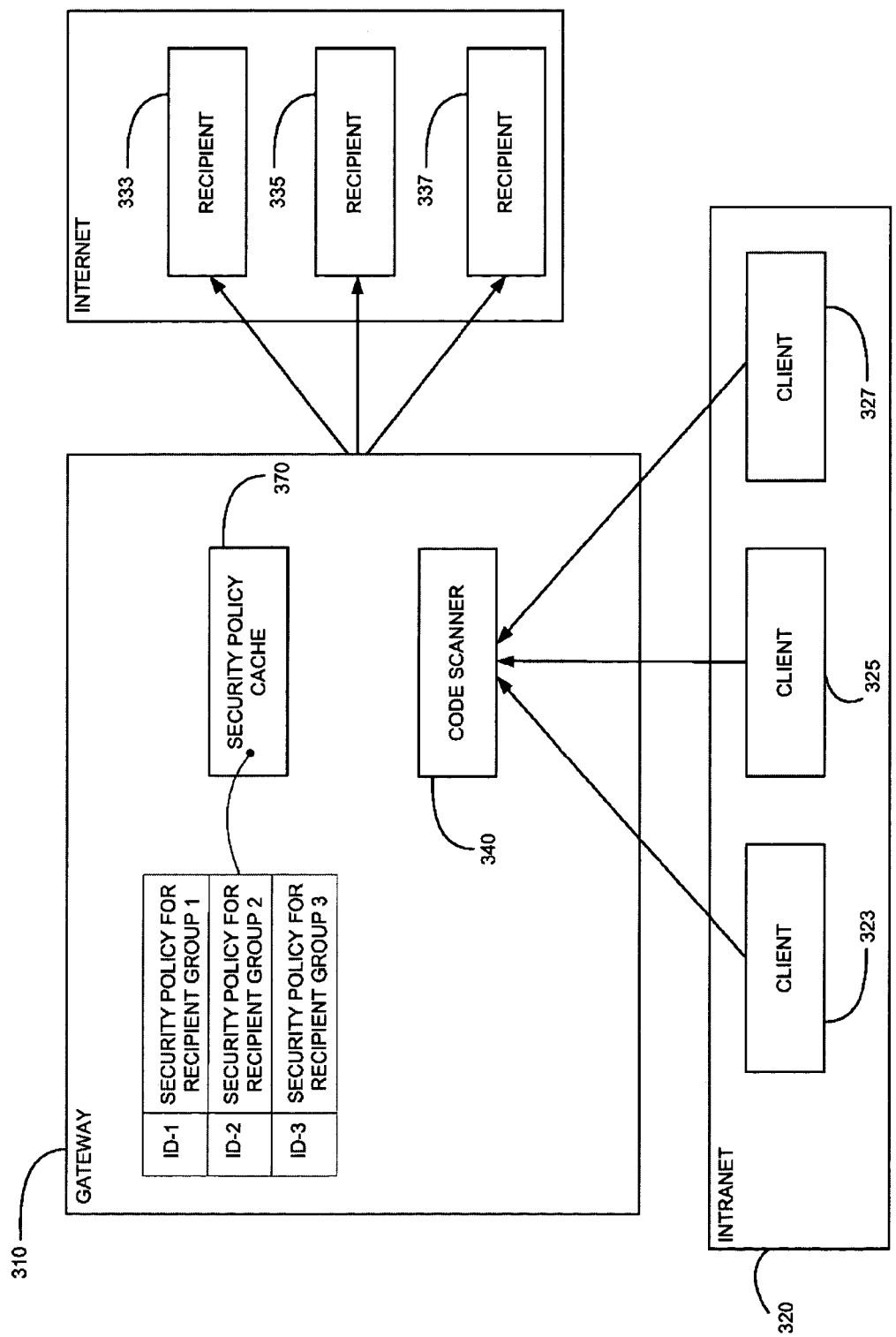
FIG. 3 is a simplified block diagram for a network gateway that control outgoing traffic, in accordance with a preferred embodiment of the present invention.

Reference is now made to FIG. 3, which is a simplified block diagram for a network gateway that controls outgoing traffic, in accordance with an alternative embodiment of the present invention. Shown in FIG. 3 is a gateway computer 310 that serves as a proxy for content being sent from client computers 323, 325 and 327 within an intranet 320, to recipients 333, 335 and 337 located outside of the intranet. A code scanner 340, situated within gateway computer 310 scans content and determines a profile of commands that the content is programmed to perform.

Preferably, gateway computer 310 includes a policy cache 370, which caches policies that restrict content from being sent from within intranet 320 to recipients outside of the intranet, based on groupings of recipients. For example, a first group of recipients may include customers of the enterprise, a second group of recipients may include legal and professional counsel of the enterprise and a third group of recipients may include everyone else.

More generally, it may be appreciated that FIG. 1 and FIG. 3 may be combined to provide a system in accordance with the present invention that controls bi-directional traffic; i.e., both incoming and outgoing content.

Additional Considerations

In reading the above description, persons skilled in the art will realize that there are many apparent variations that can be applied to the methods and systems described. Several variations are described in what follows.

1. The gateway computer described hereinabove may be embodied by a plurality of computers. Thus, for purposes of load balancing, a load balanced set of computers may serve as a gateway.
2. Although the above description follows a paradigm whereby the gateway first receives a request for a web page containing references to web objects, in some instances the gateway may receive a request for a web object without having received a request for a web page that references it. For example, in a network with a load balanced set of computers, one of the computers may receive a request for a web page, and another computer may receive a request for a web object. For another example, client software other than a web browser may download web objects directly from the Internet.

3. Although the above description mentions HTTP as a protocol for sending requests and responses, it may be appreciated that other transport protocols may be used instead. With non-HTTP protocols, it is not necessary to reference a web object from within a different request.

4. Regarding FIG. 2, in an alternative embodiment, the gateway computer may pre-fetch web objects referenced within a web page, in which case step 230 is eliminated.

5. Code scanner 140 in FIG. 1 is not required to reside within gateway computer 110. Code scanner 140 may reside instead in a different computer than gateway computer 110, and gateway computer 110 may accordingly retrieve profiles from another computer. Similarly, code scanner 340 in FIG. 3 is not required to reside within gateway computer 310.

6. Although the web content used in the above description includes web pages and web objects, in an alternative embodiment web pages may be treated as web objects themselves. Similarly, the present invention applies to non-web content as well.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer gateway for an intranet of computers, comprising:
   a scanner for scanning incoming files from the Internet and deriving security profiles for the incoming files, wherein each of the security profiles comprises a list of computer commands that a corresponding one of the incoming files is programmed to perform;
   a file cache for storing files that have been scanned by the scanner for future access, wherein each of the stored files is indexed by a file identifier; and
   a security profile cache for storing the security profiles derived by the scanner, wherein each of the security profiles is indexed in the security profile cache by a file identifier associated with a corresponding file stored in the file cache; and
   a security policy cache for storing security policies for intranet computers within the intranet, the security policies each including a list of restrictions for files that are transmitted to a corresponding subset of the intranet computers.

2. The computer gateway of claim 1 wherein each of the file identifiers comprises a hash value derived from a corresponding one of the stored files.

3. The computer gateway of claim 2 wherein the file cache and the security profile cache use the file to ensure that duplicate files are not scanned and not cached more than once.

4. The computer gateway of claim 1 wherein a file is purged from the file cache after an expiration period for the file has elapsed.

5. The computer gateway of claim 1 wherein a security profile is purged from the security profile cache when a corresponding file in the file cache is re-scanned.

6. The computer gateway of claim 1, wherein the computer gateway receives a request for a file stored among the intranet of computers;
   checks if the requested file is already resident in said file cache and,
   if so, retrieves the requested file's security profile directly from the security profile cache, based on a file ID of the requested file, and,
   if not, retrieves the requested file and passes the retrieved file to the scanner to derive a security profile for the requested file.

7. A method of operating a network gateway for an intranet of computers, the method comprising:
   receiving a request from an intranet computer for a file;
   determining whether the requested file resides within a file cache at the network gateway;
   if said determining is affirmative:
      retrieving a security profile for the requested file from a security profile cache at the network gateway, the security profile including a list of at least one computer command that the requested file is programmed to perform; and
   if said determining is not affirmative:
      retrieving the requested file from the Internet;
      scanning the retrieved file to derive a security profile including a list of computer commands that the retrieved file is programmed to perform;
      storing the retrieved file within the file cache for future access; and
      storing the security profile for the retrieved file within the security profile cache for future access.

8. The method of claim 7 further comprising indexing the security profile cache so that security profiles of files are indexed according to file identifiers (IDs).

9. The method of claim 8 wherein the file IDs are hash values of files.

10. The method of claim 9 further comprising managing the file cache and the security profile cache using the file IDs so that duplicate files are not scanned and not cached more than once.

11. The method of claim 7, further comprising purging a file from the file cache after an expiration period for the file has elapsed.

12. The method of claim 7, further comprising purging a security profile from the security profile cache when a corresponding file stored in the file cache is re-scanned.

13. A computer-readable storage medium storing program code for causing a computer to perform the steps of:
   receiving a request from an intranet computer for a file;
   determining whether the requested file resides within a file cache at the network gateway;
   if said determining is affirmative:
      retrieving a security profile for the requested file from a security profile cache at the network gateway, the security profile including a list of at least one computer command that the requested file is programmed to perform; and
   if said determining is not affirmative:
      retrieving the requested file from the Internet;
      scanning the retrieved file to derive a security profile including a list of computer commands that the retrieved file is programmed to perform;
      storing the retrieved file within the file cache for future access; and
      storing the security profile for the retrieved file within the security profile cache for future access.

14. A method of operating a network gateway for an intranet of computers, comprising:
- retrieving a requested file from the Internet;
- scanning the retrieved file to determine computer commands that the file is programmed to perform;
- deriving a security profile for the retrieved file, the security profile including a list of at least one computer command that the retrieved file is programmed to perform;
- storing the retrieved file within a file cache of the network gateway for future access, and indexing the retrieved file in the file cache with a file identifier (ID); and
- storing the security profile for the retrieved file within a security profile cache of the network gateway for future access, and indexing the security profile in the security profile cache with the file ID of the retrieved file, so that when the same file is subsequently requested from the Internet, its security profile is readily accessible from the security profile cache without the need to perform said scanning.

15. The method of claim 14 wherein the file IDs are hash values of files.

16. The method of claim 15 further comprising managing the file cache using the file IDs so that duplicate files are not cached more than once.

17. A computer-readable storage medium storing program code for causing a computer to perform the steps of:
- retrieving a requested file from the Internet;
- scanning the retrieved file to determine computer commands that the file is programmed to perform;
- deriving a security profile for the retrieved file, the security profile including a list of at least one computer command that the retrieved file is programmed to perform;
- storing the retrieved file within a file cache for future access, and indexing the retrieved file in the file cache with a file ID; and
- storing the security profile for the retrieved file within a security profile cache for future access, and indexing the security profile in the security profile cache with the file ID of the retrieved file, so that when the same file is subsequently requested from the Internet, its security profile is readily accessible from the security profile cache without the need to perform the scanning.

18. A computer gateway for an intranet of computers, comprising:
- a scanner for scanning outgoing files from an intranet to the Internet and deriving security profiles for the outgoing files, wherein each of the security profiles comprises a list of computer commands that the file is programmed to perform; and
- a security profile cache for storing security profiles derived by the scanner, for future access, wherein each of the security profiles is indexed in the security profile cache by a file ID associated with a corresponding one of the outgoing files,
- wherein for each outgoing file, the computer gateway:
  - checks whether a security profile for the outgoing file is stored in the security profile cache based on a file ID of the outgoing file,
  - if the security profile for the outgoing file is stored in the security profile cache, retrieves the security profile from the security profile cache, and,
  - if the security profile for the outgoing file is not stored in the security profile cache, passes the outgoing file to the scanner to derive a security profile for the outgoing file.

19. The computer gateway of claim 18, wherein a security profile is purged from the security profile cache when a corresponding file stored in the file cache is re-scanned.

20. A method of operating a network gateway for an intranet of computers, comprising:
- receiving an outgoing file from an intranet computer for transmission to an Internet destination;
- determining whether a security profile for the outgoing file resides within a security profile cache of the network gateway, the security profile including a list of at least one computer command that the requested file is programmed to perform;
- if said determining is affirmative:
  - retrieving the security profile for the outgoing file from the security profile cache; and
- if said determining is not affirmative:
  - scanning the outgoing file to derive a security profile for the received file, the security profile including a list of at least one computer command that the file is programmed to perform; and
  - storing the security profile for the outgoing file within the security profile cache, for future access.

21. The method of claim 20, further comprising purging a security profile from the security profile cache when a corresponding file stored in the file cache is re-scanned.

22. A computer-readable storage medium storing program code for causing a computer to perform the steps of:
- receiving an outgoing file from an intranet computer for transmission to an Internet destination;
- determining whether a security profile for the outgoing file resides within a security profile cache, the security profile including a list of at least one computer command that the requested file is programmed to perform;
- if said determining is affirmative:
  - retrieving a security profile for the outgoing file from the security profile cache; and
- if said determining is not affirmative:
  - scanning the outgoing file to derive a security profile for the received file, the security profile including a list of at least one computer command that the file is programmed to perform; and
  - storing the security profile for the outgoing file within the security profile cache, for future access.

* * * * *